United States Patent
Lin et al.

(10) Patent No.: US 10,676,596 B2
(45) Date of Patent: Jun. 9, 2020

(54) ANTIBACTERIAL MILDEWPROOF POLYURETHANE COMPOSITE MATERIAL CONTAINING NATURAL PLANT AND A PREPARATION METHOD THEREOF

(71) Applicant: STEVEN MARKETING INTERNATIONAL, INC., Katy, TX (US)

(72) Inventors: Kai Hsuan Lin, Zhangjiagang (CN); Ren Ma, Zhangjiagang (CN)

(73) Assignee: STEVEN MARKETING INTERNATIONAL, INC., Katy, TX (US)

( * ) Notice: Subject to any disclaimer, the term of this patent is extended or adjusted under 35 U.S.C. 154(b) by 155 days.

(21) Appl. No.: 16/037,245

(22) Filed: Jul. 17, 2018

(65) Prior Publication Data

US 2019/0367702 A1    Dec. 5, 2019

(30) Foreign Application Priority Data

Jun. 4, 2018   (CN) .......................... 2018 1 0565189

(51) Int. Cl.

| | | |
|---|---|---|
| *A01N 25/10* | (2006.01) | |
| *A01N 25/34* | (2006.01) | |
| *A01N 65/00* | (2009.01) | |
| *A01N 65/08* | (2009.01) | |
| *A01N 65/32* | (2009.01) | |
| *A01N 65/42* | (2009.01) | |
| *C08G 18/10* | (2006.01) | |
| *C08G 18/18* | (2006.01) | |
| *C08G 18/32* | (2006.01) | |
| *C08G 18/36* | (2006.01) | |
| *C08G 18/48* | (2006.01) | |
| *C08G 18/66* | (2006.01) | |
| *C08G 18/76* | (2006.01) | |
| *C08G 18/77* | (2006.01) | |
| *C08G 18/83* | (2006.01) | |
| *C08J 3/24* | (2006.01) | |
| *C08J 9/12* | (2006.01) | |
| *C08J 9/14* | (2006.01) | |
| *C08K 11/00* | (2006.01) | |
| *C08K 3/015* | (2018.01) | |
| *C08K 5/00* | (2006.01) | |
| *C08J 9/00* | (2006.01) | |

(52) U.S. Cl.
CPC .............. *C08K 11/00* (2013.01); *A01N 65/00* (2013.01); *C08G 18/1808* (2013.01); *C08G 18/1833* (2013.01); *C08G 18/3206* (2013.01); *C08G 18/4816* (2013.01); *C08G 18/4829* (2013.01); *C08G 18/6677* (2013.01); *C08G 18/7664* (2013.01); *C08G 18/831* (2013.01); *C08J 3/24* (2013.01); *C08J 9/0004* (2013.01); *C08J 9/125* (2013.01); *C08J 9/144* (2013.01); *C08J 2201/022* (2013.01); *C08J 2203/10* (2013.01); *C08J 2203/142* (2013.01); *C08J 2375/08* (2013.01)

(58) Field of Classification Search
CPC ................ A01N 65/42; C08G 18/4812; C08G 18/4891; C08J 9/0014; C08J 2207/10; C08J 2207/12
See application file for complete search history.

(56) References Cited

U.S. PATENT DOCUMENTS

| | | | | |
|---|---|---|---|---|
| 2007/0238800 | A1* | 10/2007 | Neal ..................... | C08G 18/283 521/174 |
| 2014/0275304 | A1* | 9/2014 | Dawe .................. | C08G 18/3275 521/117 |

FOREIGN PATENT DOCUMENTS

| | | | |
|---|---|---|---|
| CN | 103709370 A | * | 9/2014 |
| CN | 105001625 A | * | 10/2015 |
| CN | 105061717 A | | 11/2015 |
| CN | 105418880 A | | 3/2016 |
| CN | 105949428 A | | 9/2016 |
| CN | 1007474785 A | * | 12/2017 |

OTHER PUBLICATIONS

English language abstract and machine translation of CN 105959428 to Lin obtained from the European Patent Office in Feb. 2020.*

* cited by examiner

*Primary Examiner* — Melissa A Rioja
(74) *Attorney, Agent, or Firm* — SZDC Law P.C.

(57) ABSTRACT

The invention discloses an antibacterial mildewproof polyurethane composite material containing natural plant and a preparing method thereof. The composite material comprises component A and component B with a ratio of component A and component B being 100:(20-50) by weight. The component A by weight comprises: 30-60 parts plant oil polyether polyols; 20-50 parts polyether polyols I; 5-20 parts polyether polyols II; 5-20 parts composite plant extract; 0-0.5 parts catalyst; 0.5-2 parts surfactant; 0-2 parts cross-linking agent; 1.5-3 parts foaming agents. The component B by weight comprising 20-50 parts modified MDI. The composite material made according to the preparation method of the invention shows a good stability and the polyurethane products made according to the preparation method is degradable. The antibacterial mildewproof natural plant adopted by the composite material in the invention enables the composite material to prevent the bacteria breeding effectively and provides environmental protection.

10 Claims, No Drawings

ANTIBACTERIAL MILDEWPROOF POLYURETHANE COMPOSITE MATERIAL CONTAINING NATURAL PLANT AND A PREPARATION METHOD THEREOF

This application claims priority to Chinese Patent Application No. 201810565189.7, filed on Jun. 4, 2018, which is incorporated by reference for all purposes as if fully set forth herein.

BACKGROUND OF THE INVENTION

1. Field of the Invention

The present invention relates to the field of polymer chemistry, and more specifically relates to an antibacterial and mildewproof polyurethane composite material containing natural plant and a preparation method thereof.

2. Background Art

Polyurethane is a common polymer material widely used in daily life. However, the polyol used to produce polyurethane mostly comes from petrochemical products, whereas the petroleum resource non-renewable is limited and it is a big problem for conventional polyurethane products to degrade naturally. Upon expiration of its service life, conventional polyurethane products have to be combusted for disposition, which causes air pollution.

The natural plant oil base becomes a best alternative environment-friendly material owing to its being low-carbon, sustainable and degradable, which reduces dependence on petrochemical products. In addition, for polyurethane pillows, mattresses and other articles of daily use whose cores cannot be cleaned, it is necessary to provide them with antibacterial ability and mildew prevention. The existing antibacterial product only has a single antimicrobial function and cannot exert the efficacy of deodorization and reducing contaminants.

Because the plant oil-base polyurethane composite material is high-protein material, it is liable to be corrupted due to bacterial breeding. How to solve the above problem needs a prompt solution.

SUMMARY OF THE INVENTION

In view of the above, the invention discloses an antibacterial mildewproof polyurethane composite material containing natural plant, which comprises component A and component B with the ratio of component A and component B being 100:(20-50) by weight.

The Component a Comprises:
30-60 parts by weight of plant oil polyether polyols;
20-50 parts by weight of polyether polyols I;
5-20 parts by weight of polyether polyols II;
5-20 parts by weight of composite plant extract;
0-0.5 parts by weight of catalyst;
0.5-2 parts by weight of surfactant;
0-2 parts by weight of cross-linking agent; and
1.5-3 parts by weight of foaming agents; and
the component B comprises:
20-50 parts by weight of modified MDI,
wherein the plant oil polyether polyol is soybean polyol with a functionality of 1-14, a hydroxyl value of 55-240 mg KOH/g, and a plant oil content of more than 90%; the polyether polyols I has a functionality of 3, a hydroxyl value of 42 mg KOH/g; the polyether polyols II has a functionality of 1-2, a hydroxyl value of 56-115 mg KOH/g; and the compound plant extract is an extract from a mixture of garlic, Chinese pulsatilla root, honeysuckle and sage.

MDI is the abbreviation for methylene diphenyl diisocyanate. MDI can be, for example, a mixture of 4,4'-methylenediphenyl diisocyanate and its isomers. The modified MDI here is polyether modified MDI. The modified MDI is added to adjust the hardness of polyurethane composite materials to meet the demands of customers.

By adding the composite plant extract into composite material can provide the polyurethane composite material with an antimicrobial preservative effect without using chemical reagents, making the composite material friendlier to environment.

Preferably, the catalyst is an amine catalyst.

Furthermore, the amine catalyst is preferably one or more selected from bis(dimethylaminoethyl)ether, pentamethyldiethylenetriamine, N,N-dimethylcyclohexylamine, triethylenediamine and delayed catalyst. As a specific example, the catalyst is selected from the Niax A-33 amine catalyst provided by Momentive High-Tech Materials Group of the United States.

Preferably, the cross-linking agent is a short chain polyhydroxyl composite with a functionality of 2-3.

More preferably, the cross-linking agent is glycol or diethanolamine.

Preferably, the foaming agent is selected from water, dichlorofluoroethane or mixture thereof.

Preferably, the surfactant is a hydrophilic polyurethane flexible foam silicon oil. In some examples, the surfactant is selected from L-580 silicone oil provided by Momentive High-Tech Materials Group of the United States.

Preferably, the composite plant extract content is, by mass percent, 10-30:1 (%), and the particle size is 2000 meshes or above.

A method for preparing the composite material comprises the following steps:

(1) Weighing component A and component B, wherein component A contains 30-40 parts of plant oil-base polyether polyol, 20-50 parts of polyether polyol I, 5-20 parts of polyether polyols II, 5-20 parts of composite plant extract, 0-0.5 pats of catalyst, 0-2 pats of cross-linking agent, 1.5-3 parts of foaming agent, and component B comprises 20-50 parts of modified MDI;

(2) Putting the plant oil-base polyether polyol, polyether polyol I and polyether polyols II from step (1) into an agitator to mix uniformly under 30-100° C.;

(3) Subjecting the mixture of composite obtained from step (2) with plant extract to a high-speed shearing, colliding, grinding and dispersion in a high speed dispersing agitator to achieve rapid mixing, dissolution, scattering and refinement;

(4) Stirring and mixing the mixture obtained from step (3), catalyst, cross-linking agent, surfactant and foaming agent to obtain component A, and then stirring and mixing the component A and component B to react under an environmental temperature of 60° C. to shape up.

Preferably, the composite plant extract is obtained by the following steps. Putting raw materials of garlic, Chinese pulsatilla root, honeysuckle and sage into hot water of 90-95° C. to have these materials immersed in the hot water in an amount of 14 times of the materials for 2 hours. Filtering the soaked materials with 80 meshes plastic filter, conducting concentration of the filtrate by a concentrator under a temperature of 90-95° C. to a baume degree of 1.15-1.18. Drying the concentrated products with a spray drying equipment under an inlet air temperature of 110-115°

C. and an outlet air temperature of 90-95° C. for 2-3 hours. Weighing the dried product obtained from garlic, Chinese pulsatilla root, honeysuckle and sage respectively by a weight ratio of 1:1:0.5:0.5 to be shattered and intensively mixed through a pulverizer. Sieving the mixture through a sifter of 2000 meshes with residue on the sifter being further crushed and then sieved repeatedly in this way.

Due to the application of the above technical solution, the present invention has the following advantages over the existing technology: due to use of polyether polyols containing natural plant oil-base as the main raw material in combination with antibacterial mildewproof plant exacts and modified MDI, and by taking advantages of the synergistic effect among respective components and applying specific process of preparation, polyurethane composite material of the invention has good stability and antibacterial mildewproof function. The composite material is degradable and overcomes the corruption problems caused by bacterial propagation in high-protein material of conventional natural plant oil-base polyurethane material. The natural plants adopted by the composite material of the invention have an antibacterial mildewproof function, prevent the bacteria generation effectively and protect the environment.

DETAILED DESCRIPTION OF THE INVENTION

The present invention is further described by way of examples in the following. It is not intended to limit the present invention to the scope of the examples described herein. The experimental methods in the following examples of which the specific condition is not specified shall be selected according to a conventional method and condition or according to a commodity specification. Moreover, in the following examples, the selection of each component is not limited to the described, but can be the combination of other types of raw materials mentioned in the previous paragraph of SUMMARY OF THE INVENTION. The L-580 in the following embodiments is a surfactant purchased from Momentive High-Tech Materials group of the United States.

Example 1

The example provides an antibacterial mildewproof polyurethane composite material containing natural plant comprising component A and component B.

The component A by weight comprises:
40 parts of plant oil polyether polyols;
40 parts of polyether polyols I;
10 parts of polyether polyols II;
5 parts of composite plant extract;
0.5 parts of triethylenediamine;
1 part of L-580;
2 parts of ethanediol; and
2 parts of water.
The component B by weight comprises:
40 parts of modified MDI;
The ratio of component A to component B is 100:40 by weight.

The method of preparing the composite material is also provided in this example, which comprises following steps:
(1) Weighing respective components mentioned above precisely;
(2) Putting the plant oil-base polyether polyol, polyether polyol I, and polyether polyols II from step (1) into an agitator to mix them uniformly at 30-100° C.;
(3) Subjecting the mixture of composite obtained from step (2) with plant extract to a high-speed shearing, colliding, grinding and dispersion in a high speed dispersing agitator to achieve rapid mixing, dissolution, scattering and refinement;
(4) Stirring and mixing the mixture obtained from step (3) and catalyst, cross-linking agent, surfactant and foaming agent to obtain component A, and then stir and mix component A with component B to shape up by reacting under an environmental temperature of 60° C.

Example 2

This example provides an antibacterial mildewproof polyurethane composite material containing natural plant comprising component A and component B.

The component A by weight comprises:
40 parts of plant oil polyether polyols;
35 parts of polyether polyols I;
10 parts of polyether polyols II;
10 parts of composite plant extract;
0.5 parts of pentamethyldiethylenetriamine;
1 part of L-580;
2 parts of ethanediol; and
2 parts of dichlorofluoroethane
The component B by weight comprises:
35 parts of modified MDI;
The ratio of component A to component B is 100:30 by weight.

The preparation method of the composite material is same as that of example 1.

Example 3

This example provides an antibacterial mildewproof polyurethane composite material containing natural plant comprising component A and component B.

The component A by weight comprises:
40 parts of plant oil polyether polyols;
35 parts of polyether polyols I;
12 parts of polyether polyols II;
10 parts of composite plant extract;
0.5 parts of bis(dimethylaminoethyl)ether;
1.2 parts of L-580;
2 parts of ethanediol; and
2.5 parts of water.
The component B by weight comprises:
40 parts of modified MDI;
The ratio of component A to component B is 100:40 by weight.

The preparation method of the composite material is the same as that of example 1.

Example 4

This example provides an antibacterial mildewproof polyurethane composite material containing natural plant comprising component A and component B.

The component A by weight comprises:
30 parts by weight of plant oil polyether polyols;
35 parts of polyether polyols I;
15 parts of polyether polyols II;
8 parts of composite plant extract;
0.5 parts of triethylenediamine;
1 part of L-580;
2 parts of ethanediol; and
1 part of water.

The component B by weight comprises:
35 parts of modified MDI;
The ratio of component A to component B is 100:25 by weight.

The preparation method of the composite material is the same as that of example 1.

The above plant oil polyether polyol in examples 1 to 4 is soybean polyol with a functionality of 7-14, a hydroxyl value of 110-240 mg KOH/g, and a plant oil content of more than 95%; the polyether polyols I has a functionality of 3 and a hydroxyl value of 42 mg KOH/g; the polyether polyols II has a functionality of 1-2 and a hydroxyl value of 56-115 mg KOH/g; and the composite plant extract is an extract from a mixture of garlic, Chinese pulsatilla root, honeysuckle and sage.

The content of composite plant extract is 10-30:1(%) and the particle size is 2000 meshes or above. The composite plant extract is obtained by the following steps: putting raw materials of garlic, Chinese pulsatilla root, honeysuckle and sage into hot water of 90-95° C. to soak these materials in an amount of water of 14 times for 2 hours, filtering the soaked materials with 80 meshes plastic filter, conducting concentration of the filtrate by a concentrator under a temperature of 90-95° C. to a baume degree of 1.15-1.18, the concentrated products are dried with a spray drying equipment under an inlet air temperature of 110-115° C. and an outlet air temperature of 90-95° C. for 2-3 hours, weighing the dried up garlic, Chinese pulsatilla root, honeysuckle and sage respectively by a weight ratio of 1:1:0.5:0.5 to be shattered and intensively mixed through a pulverizer, sieving the mixture through a sifter of 2000 meshes with residue on the sifter being further crushed and then sieved repeatedly in this way.

Example 5

Comparative Experiment of Antibacterial

An experiment on antibacterial performance is carried out for the antibacterial mildewproof polyurethane composite materials containing natural plant obtained from examples 1 to 4.

Testing method:
The antimicrobial property of the samples was quantitatively evaluated referring to ISO 20743:2013.

Testing results:
$M_a$=logarithm of the concentration of bacterial inoculation amount at the beginning
$M_b$=logarithm of the bacteria quantity after 24 hours of inoculation (in samples without antibacterial treatment)
$M_c$=logarithm of the bacteria quantity after 24 hours of inoculation (in samples with antibacterial treatment)
S=logarithm of bacteria quantity reduced after 24 hours (in samples with antibacterial treatment)
The bacterium inoculated is *Staphylococcus aureu*.

TABLE 1

Contrast Experimental Results of Antibacterial Performance

| | |
|---|---|
| $(M_a)$ | $\log 2.04 \times 10^4 = 4.3$ |
| $(M_b)$ | $\log 9.65 \times 10^6 = 7.0$ |
| $(F_1 = M_b - M_a)$ growth value | 2.7 |

| Sample | Bacteria | Logarithm of bacteria recovery quantity | Logarithm of bacteria quantity | Ratio of bacteria quantity |
|---|---|---|---|---|

TABLE 1-continued

Contrast Experimental Results of Antibacterial Performance

| description | quantity | $(M_c)$ | decrease (S) | decrease % |
|---|---|---|---|---|
| Example 1 | $1.90 \times 10^5$ | 5.3 | 1.7 | >93.0% |
| Example 2 | $7.00 \times 10^1$ | 1.8 | 5.0 | >98% |
| Example 3 | $<2.00 \times 10^1$ | <1.3 | >5.5 | >97.2% |
| Example 4 | $1.70 \times 10^2$ | 2.2 | 4.6 | >95% |
| Control Example | $3.10 \times 10^6$ | 6.2 | 1.1 | >55% |

Table 1 shows that the composite material made according to the preparation method of the invention has a good antibacterial performance. The composite material made from components according to the preparation method of examples 2 and 3 shows a better antibacterial performance with a higher ratio of bacteria decrease and a smaller recovery quantity logarithm of recovery amount.

Example 6

Contrast Experiment of Mildewproof

An experiment of mildewproof performance is carried out on the antibacterial mildewproof polyurethane composite material containing natural plant obtained from examples 1 to 4.

TABLE 2

Result of Experiments against *Aspergillus niger*

| According to the AATCC 30 test standard | | *Aspergillus niger* |
|---|---|---|
| Name | Bacteria inhibition zone (MM) | (ATCC #6275) Surface inhibition (%) |
| Example 1 | 0 | 93.1 |
| Example 2 | 0 | 96.2 |
| Example 3 | 0 | 98.5 |
| Example 4 | 0 | 94.1 |
| Control Example | 0 | 50 |

As can be seen from Table 2, the polyurethane composite material made according to the preparation method of the invention has a good mildewproof performance. Moreover, the polyurethane composite material made according to the formula of example 3 has a better mildewproof performance.

TABLE 3

Result of Experimental against *Trichoderma virens*

| According to the AATCC 30 test standard | | *Trichoderma virens* |
|---|---|---|
| Name | Bacteria inhibition zone (MM) | (ATCC #9645) Surface inhibition (%) |
| Example 1 | 0 | 91 |
| Example 2 | 0 | 95 |
| Example 3 | 10 | 96 |
| Example 4 | 3 | 92 |
| Control Example | 0 | 25 |

As can be seen from Table 3, the polyurethane composite materials made according to the preparation method of the invention has a good mildewproof performance, among which the polyurethane composite material made from the formula of example 3 has a better superficial inhibition performance against *Trichoderma vixens*.

The examples are merely illustrative of the technical ideas and features of the present invention for the purpose of enabling those skilled in the art to understand the contents of the present invention and to implement the present invention but not limiting the protection scope of the invention. Equivalent changes or modifications made according to the spirit of the present invention should be covered by the protection scope of the present invention.

The invention claimed is:

1. An antibacterial mildewproof polyurethane composite material containing natural plant, characterized in that, said material is prepared from a component A and a component B in a weight ratio of 100:(20-50) by weight,
    wherein the component A comprises:
        30-60 parts by weight of a plant oil-based polyether polyol;
        20-50 parts by weight of polyether polyols I;
        5-20 parts by weight of polyether polyols II;
        5-20 parts by weight of a composite plant extract;
        0-0.5 parts by weight of a catalyst;
        0.5-2 parts by weight of a surfactant;
        0-2 parts parts by weight of a cross-linking agent; and
        1.5-3 parts by weight of foaming agents; and
    wherein the component B is modified methylene diphenyl diisocyanate;
    wherein the plant oil-based polyether polyol is a soybean polyol with a functionality of 2-14 and a hydroxyl value of 55-240 mg KOH/g; the polyether polyols I have a functionality of 3 and a hydroxyl value of 42 mg KOH/g; the polyether polyols II have a functionality of 2 and a hydroxyl value of 56-115 mg KOH/g; and the composite plant extract is an extract from a mixture of garlic, Chinese pulsatilla root, honeysuckle and sage.

2. The composite material according to claim 1, characterized in that, the catalyst is an amine catalyst.

3. The composite material according to claim 2, characterized in that, the amine catalyst is selected from the group consisting of bis(dimethylaminoethyl)ether, pentamethyldiethylenetriamine, N,N-dimethylcyclohexanamine, triethylenediamine and a delayed action catalyst.

4. The composite material according to claim 1, characterized in that, the cross-linking agent is a short chain polyhydroxyl compound with a functionality of 2-3.

5. The composite material according to claim 4, characterized in that, the cross-linking agent is glycol or diethanolamine.

6. The composite material according to claim 1, characterized in that, the foaming agents include water and/or dichlorofluoroethane.

7. The composite material according to claim 1, characterized in that, the surfactant is a hydrophilic silicone oil.

8. The composite material according to claim 1, characterized in that, the composite plant extract is, by mass percentage, extract has a particle size of greater or equal to 2000 mesh.

9. A method for preparing the composite material according to claim 1, characterized in that, said method comprises the following steps:
    (1) weighing a component A and a component B, wherein the component A contains 30-40 parts by weight of the plant oil-based polyether polyol, 20-50 parts by weight of the polyether polyols I, 5-20 parts by weight of the polyether polyols II, 5-20 parts by weight of the composite plant extract, 0-0.5 parts by weight of the catalyst, 0.5-2 parts by weight of the surfactant, 0-2 parts by weight of the cross-linking agent, and 1.5-3 parts by weight of the foaming agents and the component B is modified methylene diphenyl diisocyanate;
    (2) putting the plant oil based polyether polyol, polyether polyols I and polyether polyols II from step (1) into an agitator for mixing at 30-100° C.;
    (3) subjecting the mixture obtained from step (2) with the composite plant extract to a high-speed shearing, colliding, grinding and dispersion in a high speed dispersing agitator to achieve rapid mixing, dissolution, scattering and refinement;
    (4) stirring and mixing the mixture obtained from step (3) and the catalyst, the cross-linking agent, the surfactant and the foaming agent to obtain the component A, and then stirring and mixing the component A with the component B to conduct a reaction at 60° C.

10. The method according to claim 9, characterized in that, the composite plant extract is obtained by the following steps:
    immersing raw garlic, Chinese pulsatilla root, honeysuckle and sage in hot water at a temperature of 90-95° C. for 2 hours to form a mixture;
    filtering the mixture with an 80 meshes plastic filter;
    conducting concentration of the filtrate with a concentrator at a temperature of 90-95° C. a concentration of 1.15-1.18 degrees Baume;
    drying the concentrated product with a spray drying equipment with an inlet air temperature of 110-115° C. and an outlet air temperature of 90-95° C. for 2-3 hours to obtain a dried mixture comprising garlic, Chinese pulsatilla root, honeysuckle and sage in a weight ratio of 1:1:0.5:0.5;
    pulverizing the dried mixture through a pulverizer; and
    sieving the pulverized mixture through 2000 mesh sifter.

* * * * *